US005725818A

United States Patent [19]

Troughton et al.

[11] Patent Number: 5,725,818

[45] Date of Patent: Mar. 10, 1998

[54] MANUFACTURE OF HOG FUEL BOARD

[75] Inventors: Gary Ellis Troughton; Ken Lui Chan; Kenneth Gordon Love, all of Vancouver, Canada

[73] Assignee: Forintek Canada Corp., Canada

[21] Appl. No.: 672,321

[22] Filed: Jun. 28, 1996

[51] Int. Cl.[6] .......... B29C 43/02

[52] U.S. Cl. .......... 264/112; 264/115; 264/124

[58] Field of Search .......... 264/112, 115, 264/124

[56] References Cited

U.S. PATENT DOCUMENTS

| | | | |
|---|---|---|---|
| Re. 24,174 | 7/1956 | Heritage | 264/124 |
| 2,757,114 | 7/1956 | Roberts | 264/124 |
| 3,224,925 | 12/1965 | Brandts et al. | 264/124 |
| 3,887,415 | 6/1975 | Elmendorf et al. | 156/154 |
| 5,017,319 | 5/1991 | Shen | 264/124 |
| 5,021,122 | 6/1991 | Desrochers et al. | 162/150 |

FOREIGN PATENT DOCUMENTS

| | | | |
|---|---|---|---|
| 532991 | 11/1956 | Canada | 264/124 |

OTHER PUBLICATIONS

S. Chow; Bark Boards Without Synthetic Resins; Forest Products Journal; Nov. 1975; vol. 25, No. 11; pp. 32–37.

*Primary Examiner*—Mary Lynn Theisen
*Attorney, Agent, or Firm*—Oppenheimer Poms Smith

[57] ABSTRACT

A hog fuel board is made by placing a hog fuel matrix with flexible non-sticking layers on outside surfaces between screens in a preheated platen press and pressing the matrix to preset stops and for a predetermined time and pressure to cause adhesives naturally present in the hog fuel to disperse throughout the board. The process requires heating platens higher than used for particle board but avoids using a vacuum press. There is also supplied a hog fuel veneer board with a hog fuel matrix sandwiched between veneer sheets and a lumber product with a hog fuel coating thereon.

27 Claims, 1 Drawing Sheet

MANUFACTURE OF HOG FUEL BOARD

TECHNICAL FIELD

The present invention relates to a composite wood board product and more specifically a board product formed with a hog fuel matrix therein utilizing adhesives naturally present in the hog fuel that are dispersed throughout the board product during formation.

BACKGROUND ART

Hog fuel is generally sawmill refuse that has been fed through a disintegrator or hog by which the various sizes and forms are reduced to a practically uniform size of chips or shreds. Hog fuels generally contain approximately 70% to 95% bark with the residue being primarily wood.

Bark boards made without synthetic resins are known. In an Article entitled "Bark Boards Without Synthetic Resins" published by S. Chow in Volume 25, No. 11, of the Forest Products Journal, pages 32 to 37, dated November, 1975, is disclosed making bark boards without the addition of synthetic resin by forming a bark matrix into a mat and then compressing the mat in a platen press at a predetermined pressure and temperature. During the pressing step a vacuum is applied continuously to the platens to withdraw steam and water vapour. The boards were tested for dry bending strength and compared with particle board. Favourable results were obtained, however, the product has never achieved success in the marketplace.

It has now been found that by utilizing hog fuel rather than carefully selected bark, one includes at least a small percentage of wood with the bark and a percentage of wood over 5% adds additional strength to a bark board product. Inasmuch as hog fuel already has wood particles therein, it is not necessary to separate the wood particles from the bark but use the hog fuel as it comes from the hogging process to remove the bark. Furthermore, it has now been found that one can produce a hog fuel board without having to apply a vacuum to a platen press. The vacuum step is an expensive operation which may well have prevented the bark boards disclosed by Chow from being commercially feasible.

In the past hog fuel was burned, however, in today's environmental conscious environment, burning is not appropriate and therefore hog fuel accumulates in sawmills. Thus, a competitive product utilizing hog fuel provides use of what is now a waste product and solves a disposal problem.

DISCLOSURE OF INVENTION

The hog fuel board of the present invention is manufactured in existing equipment modified to have higher platen temperatures, has strength comparable with particle board and does not require the use of added adhesives but utilizes adhesives naturally present within the hog fuel. Boards made of hog fuel have greater strength in bending than boards made of bark alone. Furthermore, hog fuel boards have excellent dimensional stability for all uses as compared to other wood composite board products.

In one embodiment, the present invention provides a hog fuel veneer board comprising hog fuel matrix containing about 80% bark, the remainder being primarily wood residues, sandwiched between veneer sheets, the board having only adhesives naturally present in the hog fuel to maintain board cohesion, the adhesives dispersed throughout the matrix from heat and pressure applied to form the board. The veneer sheets provide smooth woodgrain exterior surfaces suitable for furniture and many other uses.

The present invention also provides a method of forming a hog fuel board comprising the steps of placing a hog fuel matrix containing between about 70% and 95% bark, the remainder being primarily wood residues, with flexible non-sticking layers on outside surfaces, between screens in a preheated platen press and pressing the matrix in the platen press to preset stops for a predetermined time and at a predetermined pressure to cause adhesives naturally present in the hog fuel to disperse throughout the board.

In another embodiment, a hog fuel coated board has hog fuel matrix containing about 80% bark, the remainder being primarily wood residues, on one or both sides of a lumber product. The finished board has the natural protection that bark gives to a tree, and provides improved chemical resistance, fire resistance and decay resistance over standard untreated lumber products.

BRIEF DESCRIPTION OF DRAWINGS

In drawings which illustrate embodiments of the invention.

MODES FOR CARRYING OUT THE INVENTION

The preparation of a hog fuel board is a one step process. Hog fuel, which has approximately 70% to 95% bark, the remainder being wood residues, is dried to about 3% to 5% moisture content and then ground in a Wiley mill or suitable grinder to pass a 5 mesh screen. Thus, the hog fuel has approximately a 4 mm size particles. The preferred hog fuel consistency is about 80% bark, this provides improved bending strength. If the wood content exceeds about 30% then there may be insufficient natural adhesives present to bond the board together.

Figure 1:
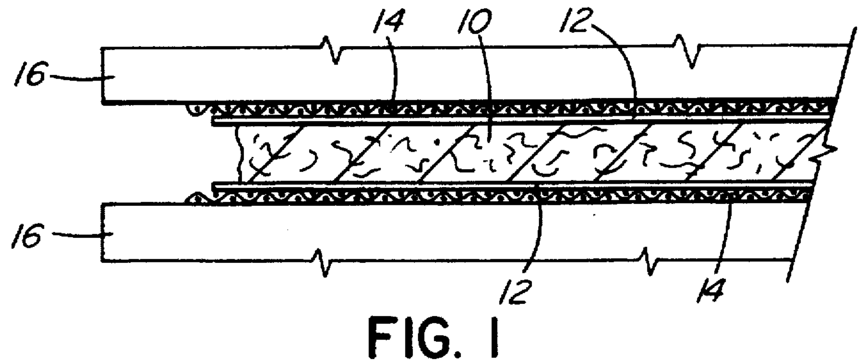
FIG. 1 is a sectional view showing a hog fuel board in a platen press.

As shown in FIG. 1, a hog fuel matrix 10 is laid between two impermeable tetrafluoroethylene polymer sheets 12, generally known under the trademark TEFLON. These sheets represent flexible non-sticking layers to prevent the hog fuel sticking. This preform assembly is placed between interwoven stainless steel wire mesh screens 14 in a preheated platen press 16. The combination of the non-sticking layers 12 and the screens 14 permit the gases produced in the heating and pressing stage to expand against the screens 14 and produce small channels or grooves allowing the gases to escape. If solid platens are used without screens then the gases remain trapped in the board, and delamination occurs.

The platen press 16 is preheated to a preset temperature higher than used for the normal production of particle board, and the preform assembly is compressed at a predetermined pressure to stops which determine board thickness. Pressure is maintained on the board in the press 16 for a preset time to permit the natural adhesives in the hog fuel to disperse throughout the matrix 10 and act as an adhesive to hold the board together.

The resulting hog fuel board has excellent dimensional stability. The bark provides a natural protection against decay, improved chemical resistance over other wood products and better flame resistance properties.

Figure 2:
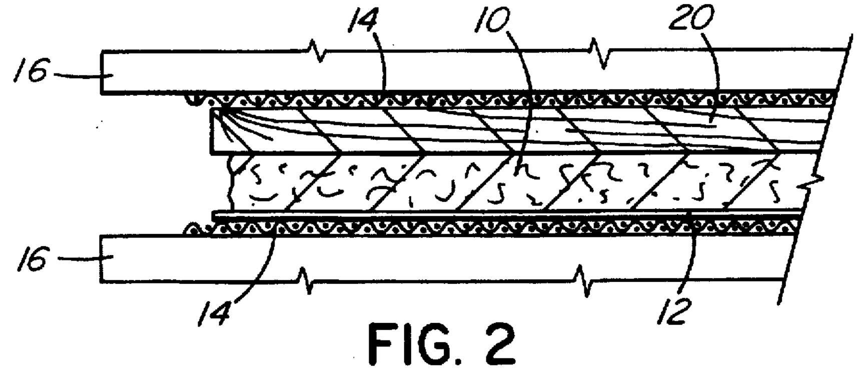
FIG. 2 is a sectional view showing a hog fuel coating on a lumber board in a platen press.
Figure 3:
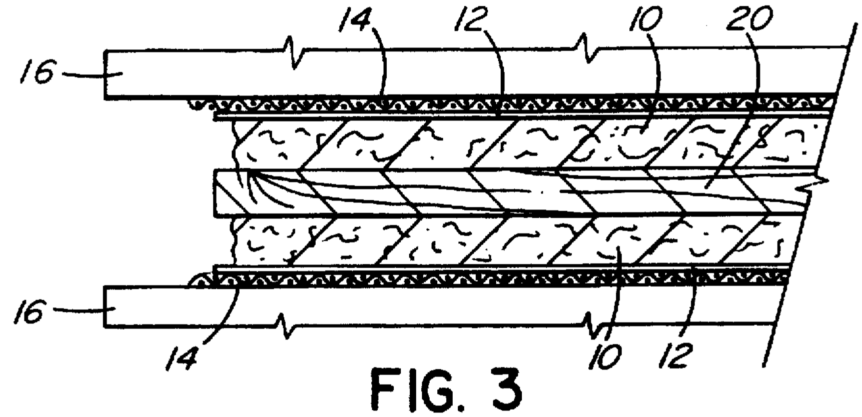
FIG. 3 is a sectional view showing a lumber product with hog fuel coatings on both sides.

In another embodiment, a hog fuel coating is applied to one or both sides of a lumber product such as a board. FIG. 2 shows a single side coating wherein a hog fuel matrix 10 is placed on a non-sticking layer 12 and a lumber 20 is placed between the screen mesh 14 and the matrix 10. In FIG. 3, two sides of the lumber 20 are coated, therefore hog fuel matrix 10 is placed on both sides. No additional adhesive is required and the natural adhesives in the hog fuel joins the hog fuel particles to the lumber 20.

In one example, 200 grams of hog fuel at 5% moisture content was placed on a 13"×13" surface on both sides of a board. The assembly was pressed to stops. Thus the density of the coating is determined by the placing of the stops and the quantity of hog fuel used. The densified bark surface produced was 1/16".

Figure 4:
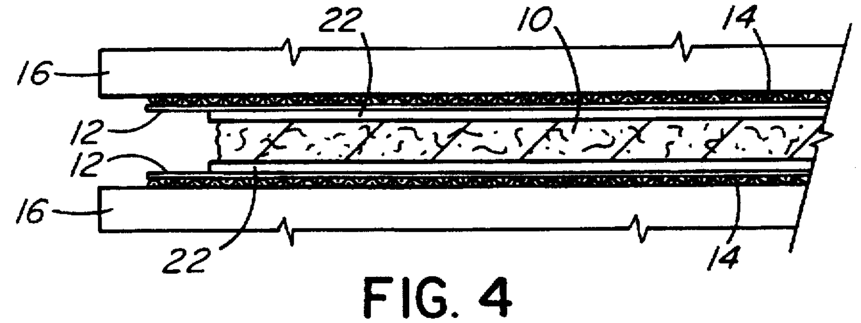
FIG. 4 is a sectional view showing a hog fuel veneer board in a platen press.

As shown in FIG. 4, a hog fuel matrix 10 is sandwiched between thin veneer sheets 22. The thickness of hog fuel is dependent upon the requirements of the board and in some cases is ruled by the space available in the platen press. Impermeable tetrafluoroethylene polymer sheets 12 are placed on both sides of the veneer sheets 22 to prevent sticking in the press. This complete preform assembly is then placed between screens 14 in a preheated platen press 16. In a preferred embodiment the preheated platen press 16 is preheated to a temperature of about 300° C. or 260° C. and the assembly is compressed to stops, representing a preset thickness of board, and maintained at a pressure to permit the natural adhesives within the hog fuel to disperse throughout the matrix 10 and act as an adhesive to join the hog fuel particles to the veneer sheets 12.

In one embodiment the Teflon sheets are 1/64" thick and are incised to ensure that any gas present within the matrix can escape from the preform assembly and the screens permit gases to pass to the sides of the press.

No vacuum is required for the pressing step, thus expensive vacuum platen presses are not needed.

In a preferred embodiment the preform assembly of the hog fuel veneer board is placed between screens and positioned in a preheated platen press at 260° C., the assembly is compressed to stops with an initial pressure of 400 psi for one minute and then the pressure is reduced to 175 psi for nineteen minutes.

In another embodiment the press is heated to 300° C., the preform assembly is compressed to stops with an initial pressure of 400 psi for one minute and then the pressure is reduced to 175 psi for four minutes. This latter pressing condition is more practical for commercial operation.

In one example a hog fuel matrix composed of 900 grams of hog fuel powder (approximately 4 mm size particles), about 80% bark, the remainder being wood residues, having a moisture content average of 3%, was placed in an open ended 12"×12" box, 5" deep between 1/16" thick 13"×13" birch veneer sheets which had been incised, and then placed between thin 15"×15" Teflon sheets. The Teflon sheets were placed on a 15"×15" interwoven stainless steel wire mesh screen (2 mm thick). A slight pressure (about 10 psi) was exerted in the press while the box was removed. The Teflon sheet and the screen were then placed on top of the assembly and it was pressed to stops at the pressure and temperature described. The bond thickness was approximately 0.4 inches thick. A 13"×13" board was produced and it was found that the board has a natural resistance to decay as the bark is the strongest and most protective portion of a tree, therefore all the protective properties of bark are applied to the wood product. In another test, a 1/32" permeable pine veneer was used which was not incised. The veneers have to permit moisture to escape onto the screens. Hog fuel board can be formed using both a hardwood veneer such as birch, and a softwood veneer such as pine. Other wood species can also be used.

In yet another embodiment a non-sticking reagent was sprayed onto the outside veneer sheets to act as a flexible non-sticking layer in place of the Teflon sheets.

Bending data for pure bark and hog fuel boards are shown in Table 1. An improvement in MOR and MOE occurs which is due to the addition of wood in the hog fuel.

TABLE 1

Bending Data for Pure Bark and Hog Fuel Boards*

| Species and type of board | Board thickness (inches) | Density (g/cc) | Avg.** MOR (psi) | Avg.** MOE (psi) |
|---|---|---|---|---|
| Pine bark (pure) | 0.19 | 0.67 | 175 | 33,500 |
| Pine hog fuel | 0.19 | 0.68 | 775 | 152,000 |
| Spruce bark (pure) | 0.19 | 0.70 | 536 | 89,000 |
| Spruce hog fuel | 0.19 | 0.69 | 940 | 174,000 |

*boards pressed 300° C. for 5 mins
**average of 2 bending samples

The durability properties of the spruce hog fuel veneer boards are reflected by the high retention of MOR (79%) and MOE (75%) after a 2-hour boil test as shown in Table 2. As well the dimensional stability was good because the hog fuel veneer boards should average 7.5% swelling after the 2-hour boil test.

TABLE 2

Bending data for spruce hog fuel veneer boards*

| Veneer Overlay | Board Thickness** (inches) | Density** (g/cc) | Avg.MOR** (psi) | Avg MOE** (psi) | Test Condition |
|---|---|---|---|---|---|
| 0.031-inch incised birch veneer | 0.24 | 0.75 | 4500 | 810,000 | Dry |
| 0.031-inch non-incised birch veneer | 0.24 | 0.74 | 4225 | 775,000 | Dry |

TABLE 2-continued

Bending data for spruce hog fuel veneer boards*

| Veneer Overlay | Board Thickness** (inches) | Density** (g/cc) | Avg.MOR** (psi) | Avg MOE** (psi) | Test Condition |
|---|---|---|---|---|---|
| 0.062-inch non-incised birch veneer | 0.43 | 0.80 | 7000 | 1,270,000 | Dry |
| | | | 5500 | 950,000*** | Boil |
| 0.031-inch non-incised pine veneer | 0.43 | 0.73 | 3170 | 736,000 | Dry |

*boards pressed at 260° C. for 20 min.
**average of 2 bending samples
***boil test - bending samples were tested after a 2-hour boil test The percentage thickness swell of pine hog fuel boards is shown in Table 3 and spruce hog fuel boards in Table 4. As can be seen after a 2-hour boil test, the boards exhibited excellent dimensional stability properties that indicate they could be used in exposed or semi-exposed situations.

TABLE 3

% Thickness swelling for pine hog fuel boards (2-hour boil test)

| Sample | Density (g/cc) | % Swelling |
|---|---|---|
| 1 | 0.85 | 7.5 |
| 2 | 0.82 | 5.9 |
| 3 | 0.82 | 6.0 |
| 4 | 0.75 | 5.9 |
| 5 | 0.83 | 6.6 |
| Avg | 0.81 | Avg 6.4 |

TABLE 4

% Thickness swelling for spruce hog fuel boards (2-hour boil test)

| Sample | (g/cc) | % Swelling |
|---|---|---|
| 1 | 0.94 | 6.0 |
| 2 | 0.87 | 6.1 |
| 3 | 0.86 | 7.1 |
| 4 | 0.82 | 8.4 |
| 5 | 0.85 | 5.7 |
| Avg | 0.87 | Avg 6.7% |

The tests for MOR and MOE were done according to CSA 3-0188.1-M-78 standard (Interior mat formed wood particle board). The range of requirements in this standard is 1,300 to 2,400 psi for minimum modulus of rupture (MOR), 160,000 to 360,000 psi for minimum modulus of elasticity (MOE) and 40 to 65 psi for minimum internal bond (IB).

Some examples of board strengths for spruce and pine hog fuel boards are shown in Tables 5 and 6 respectively. The average internal bond strengths are much higher than the standards for the highest grade particle board.

TABLE 5

Internal bond strength data for spruce hog fuel boards

| Sample | Density (g/cc) | Internal Bond (psi) |
|---|---|---|
| 1 | 0.82 | 112.1 |
| 2 | 0.91 | 144.4 |
| 3 | 0.85 | 163.3 |
| 4 | 0.83 | 111.1 |
| 5 | 0.92 | 140.0 |
| 6 | 0.83 | 94.9 |
| 7 | 0.92 | 129.3 |
| 8 | 0.85 | 130.0 |
| 9 | 85 | 120.7 |
| 10 | 0.79 | 109.0 |
| | 0.86 | Avg 125.5 |

TABLE 6

Internal bond strength data for pine hog fuel boards

| Sample | Density (g/cc) | Internal Bond (psi) |
|---|---|---|
| 1 | 0.84 | 94.3 |
| 2 | 0.84 | 75.6 |
| 3 | 0.87 | 106.3 |
| 4 | 0.85 | 67.6 |
| 5 | 0.87 | 73.9 |
| 6 | 0.87 | 74.9 |
| 7 | 0.84 | 86.5 |
| 8 | 0.90 | 78.1 |
| 9 | 0.88 | 80.6 |
| 10 | 0.88 | 92.6 |
| | Avg 0.86 | Avg 83.0 |

The hog fuel boards and board coatings are formed in a single step without having to have overlays added. The end product was found to have strength properties consistent with particle board and which had a natural resistance to decay. The bark tends to be more resistant to chemicals than plain wood as it is a protective coating for the tree.

Various changes may be made to the embodiments shown herein without departing from the scope of the present invention which is limited only by the following claims.

The embodiments of the present invention in which an exclusive property or privilege is claimed are defined as follows:

1. A method of forming a hog fuel board comprising the steps of:

forming a hog fuel matrix containing between about 70% and 95% bark, the remainder being primarily wood residues, with flexible non-sticking layers on outside surfaces, between screens in a preheated platen press and pressing the matrix in the platen press to preset stops for a predetermined time and at a predetermined pressure to cause adhesives naturally present in the hog fuel to disperse throughout the board.

2. The method of forming a hog fuel board according to claim 1 wherein the hog fuel contains about 80% bark, the remainder being primarily wood residues.

3. The method of forming a hog fuel board according to claim 1 wherein the hog fuel is dried to a moisture content in the range of about 3% to 5%.

4. The method of forming a hog fuel board according to claim 1 wherein the flexible non-sticking layer is a tetrafluoroethylene polymer sheet.

5. The method of forming a hog fuel board according to claim 3 wherein the tetrafluoroethylene polymer sheet is 1/64" thick and is incised.

6. The method of forming a hog fuel board according to claim 3 wherein the hog fuel is initially ground to pass through a 5 mesh screen, thus having approximately 4 mm size particles.

7. A method of forming a hog fuel veneer board comprising the steps of:

placing a hog fuel matrix containing between about 70% and 95% bark, the remainder being primarily wood residues, between veneer sheets with flexible non-sticking layers on outside surfaces of the veneer sheets to form a preform assembly;

positioning the assembly between screens in a preheated platen press, and pressing the preform assembly in the platen press to preset stops for a predetermined time and at a predetermined pressure to cause adhesives naturally present in the hog fuel to disperse throughout the assembly.

8. The method of forming hog fuel veneer board according to claim 7 wherein the hog fuel matrix contains about 80% bark, the remainder being primarily wood residues.

9. The method of forming a hog fuel veneer board according to claim 7 wherein the hog fuel is dried to a moisture content in the range of about 3% to 5%.

10. The method of forming a hog fuel veneer board according to claim 7 wherein the veneer sheets are incised.

11. The method of forming a hog fuel veneer board according to claim 10 wherein the veneer sheets are 1/16" thick birch.

12. The method of forming a hog fuel veneer board according to claim 10 wherein the veneer sheets are 1/32" thick pine.

13. The method of forming a hog fuel veneer board according to claim 7 wherein the platen press is heated to a temperature in the range of about 260° C. to 300° C.

14. The method of forming a hog fuel veneer board according to claim 13 wherein the platen press is preheated to a temperature of about 260° C., and wherein the preform assembly is pressed at a pressure of about 400 psi for about one minute, followed by a pressure of 175 psi for about nineteen minutes.

15. The method of forming a hog fuel veneer board according to claim 13 wherein the platen press is preheated to a temperature of about 300° C. and wherein the preform assembly is pressed at a pressure of about 400 psi for about one minute, followed by 175 psi for about four minutes.

16. The method of forming a hog fuel veneer board according to claim 7 wherein the flexible non-sticking layer is a tetrafluoroethylene polymer sheet.

17. The method of forming a hog fuel veneer board according to claim 16 wherein the tetrafluoroethylene polymer sheet is 1/64" thick and is incised.

18. The method of forming a hog fuel veneer board according to claim 8 wherein the hog fuel is initially ground to pass through a 5 mesh screen, thus having approximately 4 mm size particles.

19. A method of forming a hog fuel coating on a lumber product, comprising the steps of:

placing a hog fuel matrix containing between about 70% and 95% bark, the remainder being primarily wood residues, onto at least one surface of a lumber product with a flexible non-sticking layer on an outside surface of the hog fuel matrix to form a preform assembly;

positioning the assembly in a preheated platen press with a screen between the non-sticking layer and the platen press, pressing the preform assembly in the platen press to preset stops for a predetermined time and at a predetermined pressure to cause adhesives naturally present in the hog fuel to disperse throughout the assembly.

20. The method of forming a hog fuel coating on a lumber product according to claim 19 wherein the hog fuel matrix contains about 80% bark, the remainder being primarily wood residues.

21. The method of forming a hog fuel coating on a lumber product according to claim 19 wherein the hog fuel is dried to a moisture content in the range of about 3% to 5%.

22. The method of forming a hog fuel coating on a lumber board according to claim 21 including the steps of placing a hog fuel matrix on both sides of the lumber product, with flexible non-sticking layers on outside surfaces of the matrix, positioning the assembly between screens in the preheated platen press.

23. The method of forming a hog fuel coating according to claim 20 wherein the assembly is pressed to produce a densified hog fuel surface approximately 1/16" thick.

24. The method of forming a hog fuel coating according to claim 20 wherein the platen press is heated to a temperature in the range of about 260° C. to 300° C.

25. The method of forming a hog fuel veneer board according to claim 20 wherein the flexible non-sticking layer is a tetrafluoroethylene polymer sheet.

26. The method of forming a hog fuel veneer board according to claim 25 wherein the tetrafluoroethylene polymer sheet is 1/64" thick and is incised.

27. The method of forming a hog fuel veneer board according to claim 20 wherein the hog fuel is initially ground to pass through a 5 mesh screen, thus having approximately 4 mm size particles.

* * * * *